Inventor
Clyde L Smith
By [signature]
Attorney

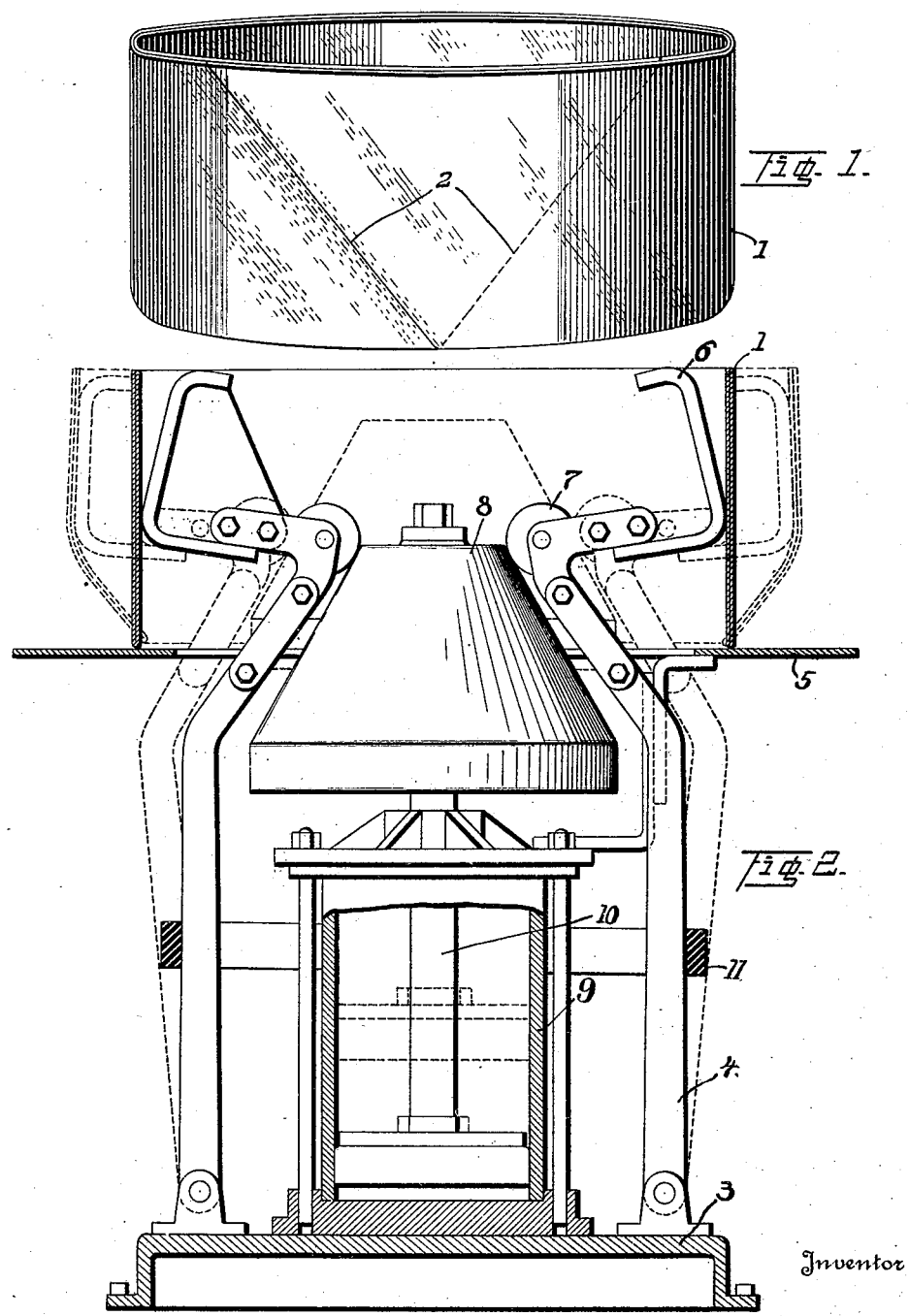

Oct. 29, 1929.    C. L. SMITH    1,734,023
METHOD OF MANUFACTURING TIRES
Filed March 7, 1923    3 Sheets-Sheet 3

Inventor
Clyde L. Smith.
By
Attorney

Patented Oct. 29, 1929

1,734,023

UNITED STATES PATENT OFFICE

CLYDE L. SMITH, OF AKRON, OHIO, ASSIGNOR TO THE FIRESTONE TIRE & RUBBER COMPANY, OF AKRON, OHIO, A CORPORATION OF OHIO

METHOD OF MANUFACTURING TIRES

Application filed March 7, 1923. Serial No. 623,309.

This invention relates to a process of manufacturing tires and particularly to a new and improved process of applying the fabric to cores in the construction of tires, the object being to provide a simple and easily operable method of applying the fabric so that the fabric can be readily applied and will be evenly stretched throughout the circumference of the core and substantially centered thereon.

Further objects and advantages will be apparent from the detailed description of the invention, it being understood that the method and apparatus shown and described are capable of variations and modifications without sacrificing any of the merits of the invention.

In the drawings in which one embodiment of the invention is shown:

Fig. 1 is a view showing the band preparatory to the stretching operation.

Fig. 2 is a view of the band in section on an apparatus for stretching it to the required circumference.

Figure 3:
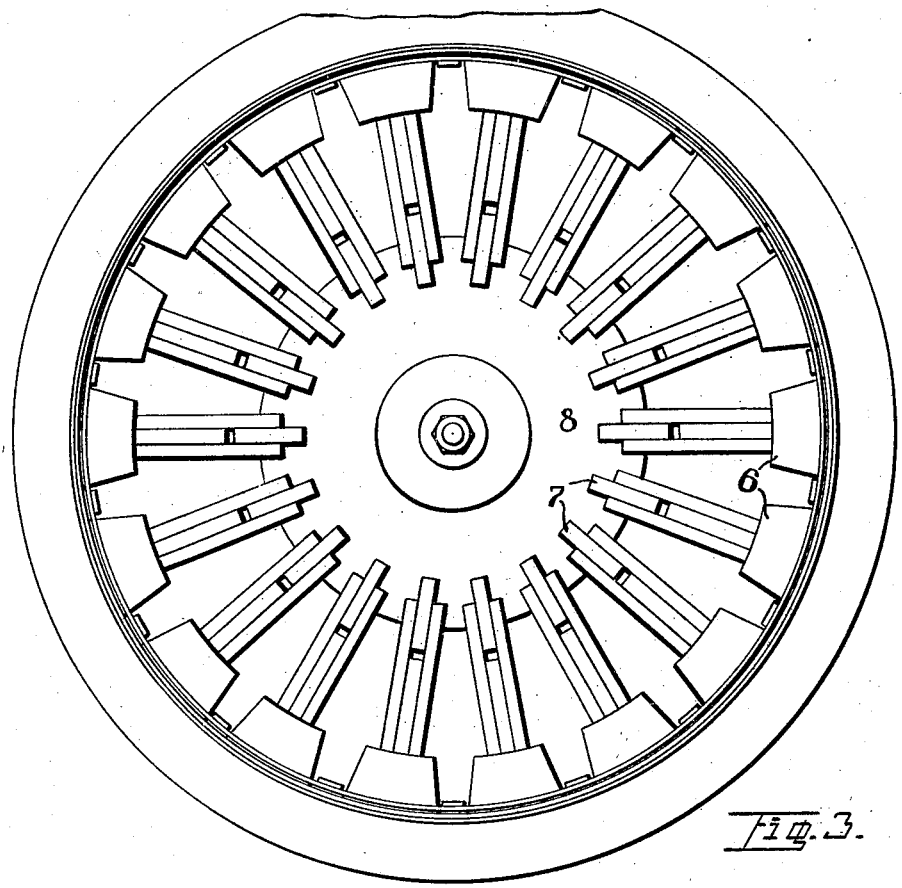
Fig. 3 is a plan view of Fig. 2 with the carrier or transfer ring in position.

The object of the invention is to place a complete ring of tire fabric over a tire building core with as little trouble as possible and at the same time to obtain an evenly distributed tension through the entire circumference of the band and center it on the core.

For this purpose the fabric to constitute the plies of the tire, either cross woven or cord, is formed into an endless ring which is less in circumference than the outer circumference of the core to which it is to be applied.

Such a band is shown in Fig. 1, being illustrated as a two ply ring 1, which is made by folding a double width of fabric and then joining the ends together in a substantially V-shaped splice 2. For practicing the invention it is not necessary that a multiple ply band be used or that the form of splice be maintained.

The band or ring of fabric, however obtained, is placed in a suitable expanding device by which it is stretched or expanded to a circumference sufficient to enable at least one side of the band to pass over to the tire core.

Such an apparatus with the unstretched band in position is shown in Fig. 2. While other devices may be used, the one shown comprises a base 3 which supports a plurality of pivoted arms 4. The upper ends of the arms pass through a table 5 and carry at their upper ends shoes 6. Each arm carries a roller 7, which rollers ride upon a vertically movable expanding cone 8. A fluid operated cylinder 9 is secured to the center of the base 1 and moves a piston 10 which is connected to the cone 8. An elastic band 11 may surround the arms 4 and retract them when the cone is lowered.

The contour of the shoes and their extent may be varied. Those shown in the drawing are intended to be slightly deeper than one-half the width of the band and are so formed that when expanded their faces are substantially vertical. The table 5 serves to support the band and center it with respect to the shoes.

In Fig. 2 the band is shown in unexpanded condition in full lines and in expanded condition in dotted lines.

Figure 4:
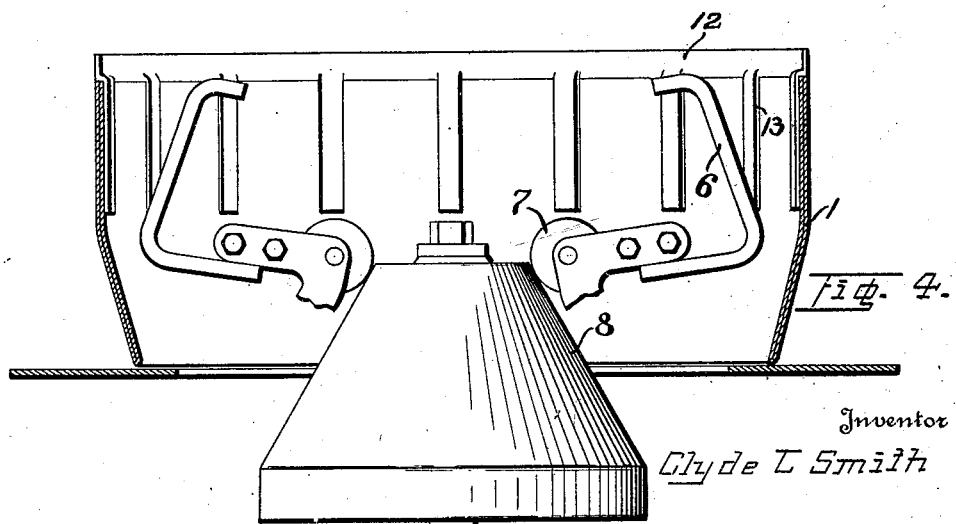
Fig. 4 is a cross section showing the manner in which the band is taken from the expanding mechanism.
Figures 5, 6:
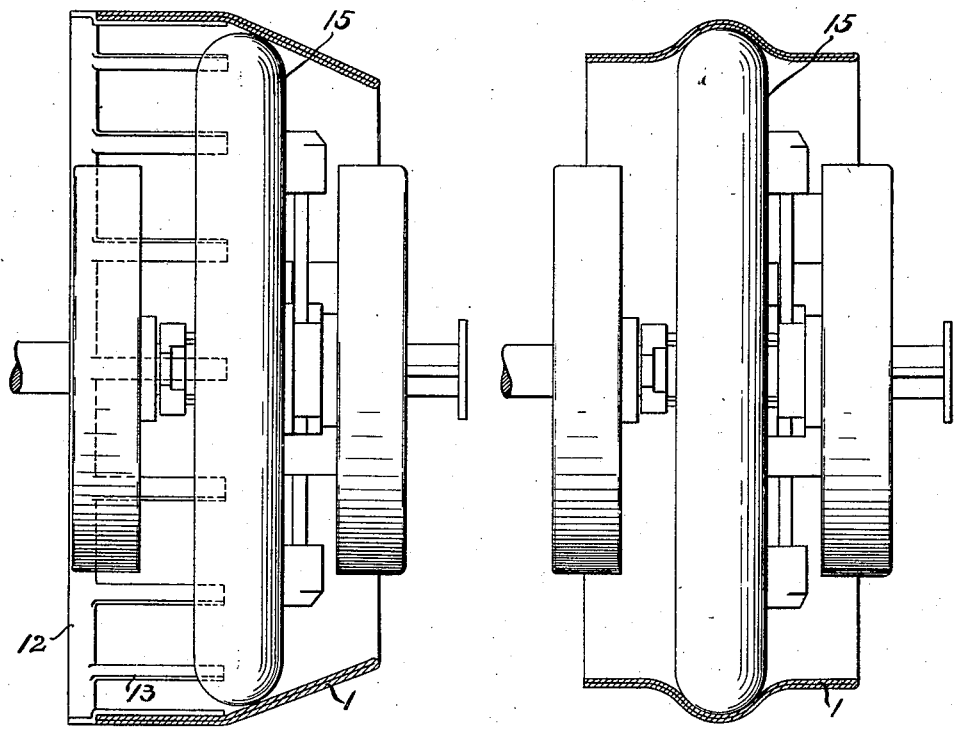
Fig. 5 is a view of the tire building core showing the fabric ring in section as applied to the core.
Fig. 6 is a view similar to Fig. 5 with the band released in position on the core.
Figure 7:
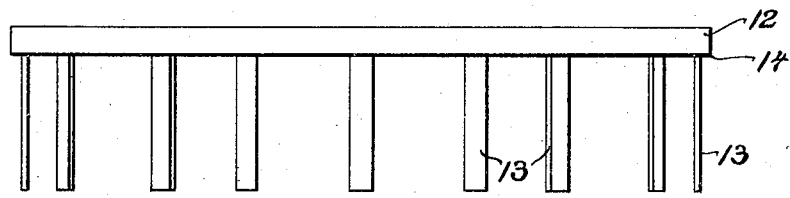
Fig. 7 is a side elevation of the carrier or transfer ring.

In order to transfer the expanded band from the expander to the core, use is made of a ring shaped carrier shown in Figs. 4, 5 and 6. This carrier comprises an outer ring 12 from which project fabric supporting means, such as a plurality of fingers 13 which are preferably offset from the ring and in number equal to the number of shoes 6 on the expander. The shoulder 14 on the ring serves as a stop for fixing the elevation of the fingers within the band and the fingers are of proper length to reach to nearly the center of the band.

When the device is used, the ring is placed over the expanded fabric band, the fingers being inserted between the shoes with the shoulder positioned against the upper edge of the fabric. The position of the carrier ring is illustrated in Figs. 3 and 4. When the ring is in position, the piston 10 is lowered and the withdrawal of the shoes causes the band to contact on the fingers 13.

It will be observed that the band of fabric is now expanded to a cylinder over approximately one-half of the band, the remainder contracting to its original diameter forming a core of fabric.

The tire building core is illustrated in Figs. 5 and 6 at 15 and may be of any suitable form or construction. The inner circumference of the fingers 13 is such that the ring can be passed over the core and fabric thereon, the reason for which will be apparent.

The ring 12 with the fabric band thereon is lifted from the table and placed over the core as shown in Fig. 5 with the ring passed over the core first. Preferably the ends of the fingers are a little short of the center line of the fabric so that as the ring is applied, the fabric will come in contact with the core with the center line of the fabric coinciding with the center line of the core. The fabric adheres to the core and the carrier ring can be removed whereupon the fabric will contact as shown in Fig. 6 and very little centering is required to place it in position for the shaping operation. At the same time the band is accurately stretched over its entire circumference so that the fullness of the skirts is evenly distributed about the core. These beneficial results not only assist in the subsequent fabric shaping operation, but reduce the waste in the trimming operation.

After the fabric is placed on the core, the carrier ring is passed back over the core and the operator can proceed with the shaping of the tire fabric.

The method and apparatus described afford an extremely economical and rapid manner of placing the fabric on the core. The expanding device of Fig. 2 is placed close to the tire making machine. One operator may place bands of fabric on several of the expanders and then operate the core to hold the fabric in distended condition. The tire builder inserts the ring in position, releases the cone 8 and can then lift the ring and the band from the table and place it over the core. The release of the fabric about the core takes but a moment and he is ready to form the tire. The invention is so simple and easily operated as to naturally lessen the cost of tire building and at the same time accomplishes better results by accurately stretching and positioning the fabric.

I claim:

1. The process for manufacturing tires, which comprises expanding a portion of a band of fabric to a circumference slightly greater than the core throughout one side of the band, placing the band on a carrier adapted to hold the band in the expanded condition described, and passing the carrier with the expanded portion of the band over the core allowing the unexpanded portion thereof to contact the core without contracting the expanded portion and to remove the expanded portion from the carrier as the movement of the latter is continued.

2. The process for manufacturing tires, which comprises expanding a band of fabric to a circumference slightly greater than the core throughout one side of the band and approximately to the center of the band, placing the band on a carrier adapted to hold the band expanded as described, passing the carrier with the expanded portion of the band over the core until the center line of the band contacts the core and without contracting the expanded portion and continuing the movement of the carrier whereby the expanded portion of the band will be withdrawn therefrom and will contract onto the core.

CLYDE L. SMITH.